Sept. 3, 1940.   D. H. BUCKLEY   2,213,458
SEPTIC TANK
Filed Sept. 2, 1938
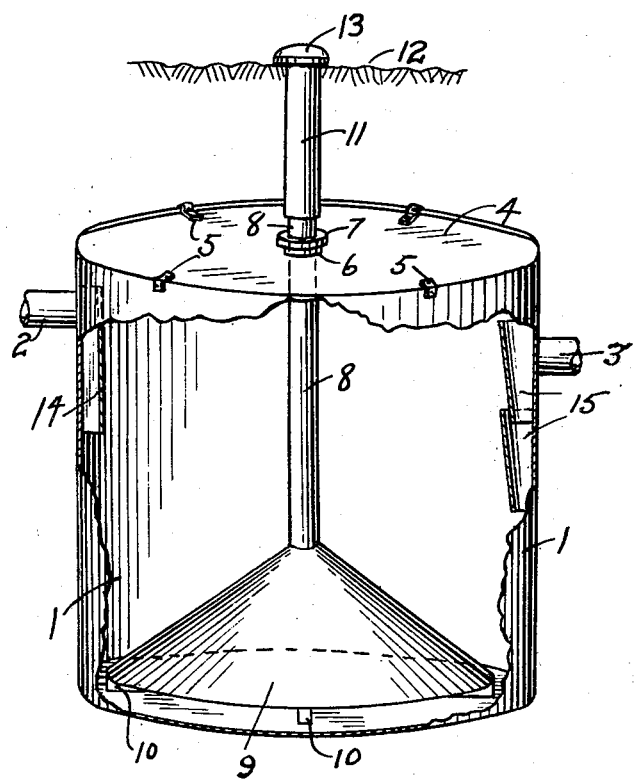
Duer H. Buckley
INVENTOR.
BY W.B. Harpman
ATTORNEY.

Patented Sept. 3, 1940

2,213,458

UNITED STATES PATENT OFFICE 2,213,458

SEPTIC TANK

Duer H. Buckley, Warren, Ohio, assignor to J. W. Swanson, Sharon, Pa.

Application September 2, 1938, Serial No. 228,167

2 Claims. (Cl. 210—6)

This invention relates to a sewage treating apparatus of the kind commonly known as septic tanks and in which the heavier and lighter parts of the sewage are separated and undergo certain changes due to bacteriological action within the tank.

The principal object of this invention is the provision of a septic tank which is so constructed that the capacity of the tank may be utilized to the best advantage for the settling of the sewage in that a relatively large settling area is provided and is equipped with a practical means for removing natural accumulation of sludge without otherwise disturbing the contents of the tank or requiring that the tank be opened.

It is well known that after a septic tank has been in use over a period of years a considerable accumulation of sludge is formed in the bottom of the tank and that if this sludge is not removed it will seriously affect the efficient action of the tank and result in an unsanitary, undesirable condition. Heretofore it has been necessary to dig up the tank, open it and remove the sludge, it being obvious that this task involves considerable time and effort and results in the destruction of the lawn or shrubs under which the tank may be buried. In my invention I have provided a septic tank so designed that the sludge may be removed from time to time without digging up the tank or in any way disturbing the lawn or shrubs or disturbing the liquid contents of the tank itself. This desirable feature is built within the tank at the time of the tank's installation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein the figure is a perspective view of a septic tank with parts broken away showing a sludge suction member positioned within the tank.

By referring to the drawing, it will be seen that the invention comprises a septic tank 1 having a suitable inlet opening 2 and an outlet opening 3. A top section 4 is positioned upon the tank 1 by means of a plurality of clamps 5. Centrally positioned in this top section 4 there is an opening 6 in which a plug 7 has been positioned. Positioned in the plug 7 and extending therethrough there is a vertical suction tube 8 which terminates at its lower end in a circular cone shaped suction member 9 which is in turn positioned upon the bottom of the tank 1 at a slight distance therefrom by means of a plurality of legs 10. The circular cone shaped suction member 9 being of slightly smaller diameter than the inside of the tank 1 so as to permit the natural accumulation of sludge to pass between the inside walls of the tank 1 and the edges of the circular cone shaped suction member 9. Telescopically positioned upon the upper end of the vertical suction pipe 8 there is a secondary vertical suction pipe 11 which is of a sufficient length to reach to the surface of the ground 12 and is provided at this point with a suitable cap 13 which may or may not be provided with vent holes as desired.

In order that the sewage flowing into the tank may be directed toward the bottom thereof, a suitable directional baffle 14 is positioned adjacent to the intake opening 2 and extends below the liquid level of the tank. A pair of similar baffles 15 are provided at the opposite side of the tank 1 and adjacent to the outlet opening 3.

It will be seen that I have provided a simple and extremely practical form of septic tank combined with a positive means for removing the sludge therefrom in that it is only necessary to attach a pump to the sludge suction member or tube in order to pump out the sludge without affecting the liquid contents of the tank. The wide area of the suction member assuring the even slow flow of the sludge from the tank bottom. It is obvious therefore that this form of septic tank is of practical design, highly efficient, and forms a convenient and satisfactory sewage disposal system.

What I claim is:

1. The combination of a septic tank having inlet and outlet openings and baffles positioned adjacent thereto and a top portion adapted to cover the top of the said tank, a centrally positioned opening in the said top portion and a plug adapted to be received by the said opening; a tube positioned in the said plug and extending downwardly into the said tank, an inverted cone shaped suction member positioned near the bottom of the said tank and connecting with the said tube, the upper end of the said tube adapted to receive a secondary tube telescopically, the said secondary tube being of sufficient length to reach to the surface of the ground in which the tank is placed so as to enable the sludge in the said tank to be pumped out of the tank through the said suction member and the said tube and secondary tube.

2. A septic tank having a sludge collection means formed as a part thereof and comprising a tank, a top portion adapted to cover the tank, inlet and outlet openings formed in the tank, an inverted cone shaped sludge direction member positioned on short legs in the bottom of the said tank so as to direct sludge settling in the tank to the edges thereof and permit the said sludge to fill the space beneath the said direction member, a tubular connection formed on the said direction member and extending upwardly through said cover portion of the said tank, a secondary tubular section telescopically positioned on the said tubular section and adapted to communicate with the surface of the ground so that a suction hose may be lowered therethrough and the sludge pumped from the tank thereby.

DUER H. BUCKLEY.